(12) United States Patent
Anast et al.

(10) Patent No.: US 8,038,099 B2
(45) Date of Patent: Oct. 18, 2011

(54) BONDED METAL FUSELAGE AND METHOD FOR MAKING THE SAME

(75) Inventors: Peter Z. Anast, Sammamish, WA (US); Perry T. Horst, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 978 days.

(21) Appl. No.: 12/112,106

(22) Filed: Apr. 30, 2008

(65) Prior Publication Data

US 2009/0272846 A1 Nov. 5, 2009

(51) Int. Cl.
*B64C 1/00* (2006.01)
(52) U.S. Cl. .......................... 244/119; 244/120
(58) Field of Classification Search .................. 244/119, 244/120, 117 R, 123.1, 132
See application file for complete search history.

(56) References Cited

U.S. PATENT DOCUMENTS

| | | | |
|---|---|---|---|
| 3,025,208 A | 3/1962 | Geiger | |
| 3,071,217 A | 1/1963 | Gould | |
| 3,976,269 A * | 8/1976 | Gupta | 244/119 |
| 4,113,910 A | 9/1978 | Loyd | |
| 4,715,560 A | 12/1987 | Loyek | |
| 4,783,228 A | 11/1988 | Aker et al. | |
| 4,811,540 A | 3/1989 | Kallies et al. | |
| 4,828,202 A * | 5/1989 | Jacobs et al. | 244/117 R |
| 5,842,317 A | 12/1998 | Pettit | |
| 6,511,570 B2 * | 1/2003 | Matsui | 156/245 |
| 6,648,273 B2 | 11/2003 | Anast | |
| 6,684,593 B2 * | 2/2004 | Brenneis et al. | 52/630 |
| 7,052,572 B2 | 5/2006 | Miura et al. | |
| 7,080,805 B2 | 7/2006 | Prichard et al. | |
| 7,087,317 B2 | 8/2006 | Ehrstrom et al. | |
| 7,134,629 B2 | 11/2006 | Johnson et al. | |
| 7,159,822 B2 | 1/2007 | Grantham et al. | |
| 7,527,222 B2 * | 5/2009 | Biornstad et al. | 244/120 |
| 2004/0155148 A1 * | 8/2004 | Folkesson et al. | 244/119 |
| 2007/0095475 A1 | 5/2007 | Hable et al. | |
| 2008/0164372 A1 * | 7/2008 | Gallet et al. | 244/119 |
| 2009/0057487 A1 * | 3/2009 | Velicki et al. | 244/119 |
| 2010/0308165 A1 * | 12/2010 | Markowski et al. | 244/119 |

FOREIGN PATENT DOCUMENTS

WO WO 2004/039670 A2 5/2004

OTHER PUBLICATIONS

"Adhesive Bonding of Aircraft Structures", A. Higgins, British Aerospace Regional Aircraft, Woodford, Cheshire, UK, International Journal of Adhesion & Adhesives 20 (2000), pp. 367 to 376, Accepted Jan. 26, 2000.
"Thin Shells in Aeroapace Structures", Nicholas J. Hoff, AIAA Paper No. 66-1022, 1966.
"Citation III Bonded Structure", Robert B. Held, AIAA Paper No. 84-2244, 1984.

* cited by examiner

*Primary Examiner* — Christopher P Ellis
(74) *Attorney, Agent, or Firm* — Tung & Associates

(57) ABSTRACT

A bonded metal fuselage for aerospace vehicles includes a monocoque structure having an outer metal skin, metal tear straps bonded to the outer skin and metal stringers bonded to the outer skin and to the tear straps. The outer chords of fuselage frames are fastened directly to tear straps and to the skin, obviating the need for clips to fasten the frames to the stringers.

25 Claims, 4 Drawing Sheets

BONDED METAL FUSELAGE AND METHOD FOR MAKING THE SAME

TECHNICAL FIELD

This disclosure generally relates to fuselage structures for aerospace vehicles, and deals more particularly with a fuselage having bonded metal components that result in increased fuselage strength and/or weight reduction.

BACKGROUND

In metal monocoque fuselage structures for aerospace vehicles such as airplanes, frames and stringers are commonly attached to the metal skin by fasteners such as rivets having heads that are countersunk within the skin. In some cases, circumferential strips of material, commonly known as "tear straps", are placed between the skin and the frames in order to reduce hoop stress. Also, in some cases, separate clips are used to connect the stringers to the frames in order to transfer a portion of the load on the stringers to the frames. In order to assure that the skin exhibits uniform structural strength, the gauge or thickness of the skin in the area of the fasteners is increased so as to form "lands" or "pad-ups" whose thickness is sufficient to accommodate the countersink depth of the fastener head. The skin lands add weight to the aircraft, and increase aircraft assembly time since it is necessary to machine or otherwise remove a portion of the skin thickness in order to form the lands.

It would therefore be desirable to reduce or eliminate the need for skin lands in order to reduce fuselage weight and assembly time. It would also be desirable to reduce the number of fasteners required to attach the skin to the stringers and the frame.

SUMMARY

The disclosed embodiments provide a metal fuselage construction exhibiting reduced weight and/or increased strength. Through the use of bonded components, the number of fasteners may be reduced and thinner skins may be employed, particularly where fasteners are no longer required. The elimination of clips to structurally connect stringers and frames may reduce the load that may be transferred by the stringers to the frames, resulting in stringers and frames that may possess greater independent stability.

According to one disclosed embodiment, an aerospace vehicle fuselage comprises a monocoque structure having an outer skin, tear straps bonded to the outer skin and stringers bonded to the outer skin and to the tear straps; frames; and fasteners for fastening the frames to the tear straps and to the skin. The frames may include openings through which the stringers extend transverse to the frames. The stringers extend transverse to the tear straps and the tear straps are sandwiched between the stringers and the skin. Each of the stringers includes a surface facing the skin, and the stringers include a joggle through which one of the tear straps extends. The tear straps are bonded to the stringers in the area of the joggle. Each of the frames may include a pair of oppositely extending flanges on one end of a web, wherein each of the flanges engages and is fastened to a tear strap.

According to another disclosed embodiment, a fuselage for a vehicle having a longitudinal axis comprises: a skin having an inner surface and an outer surface; a plurality of longitudinally extending, circumferentially spaced stringers bonded to the inner surface of the skin; a plurality of longitudinally spaced, circumferentially extending frames; and, a plurality of tear straps respectively sandwiched between the frames and the inner surface of the skin, wherein each of the tear straps is bonded to the inner surface of the skin. Portions of the stringers are bonded to the tear straps in an area of a joggle formed on one side of the stringers.

According to a disclosed method embodiment, fabricating a fuselage for an aerospace vehicle comprises: fixing frames to a skin of the fuselage; placing tear straps between each of the frames of the skin; bonding the tear straps to an inner surface of the skin; fixing stringers to the skin; and bonding portions of the stringers to the tear straps. Fixing the frames to the skin may be performed by installing fasteners between each of two flanges on each frame and the skin. The frames are fixed to the skin after the tear straps have been bonded to the skin and after the stringers have been bonded to portions of the tear straps.

According to another method embodiment, fabricating a fuselage for an airplane, comprises: bonding metal tear straps to an inner surface of a metal fuselage skin; bonding metal stringers to the inner surface of the skin and to the tear straps; placing frames over the tear straps; and, fastening the frames to the tear straps and to the skin using fasteners. The method may further comprise forming a joggle in one side of the stringers for receiving a tear strap. The method may further comprise forming a pair of flanges on the frame and placing fasteners through the flanges, the tear straps and the skin.

The disclosed embodiments satisfy the need for an improved metal fuselage construction making use of bonded components to reduce skin thickness requirements and to reduce the number of fasteners used to join the structure.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
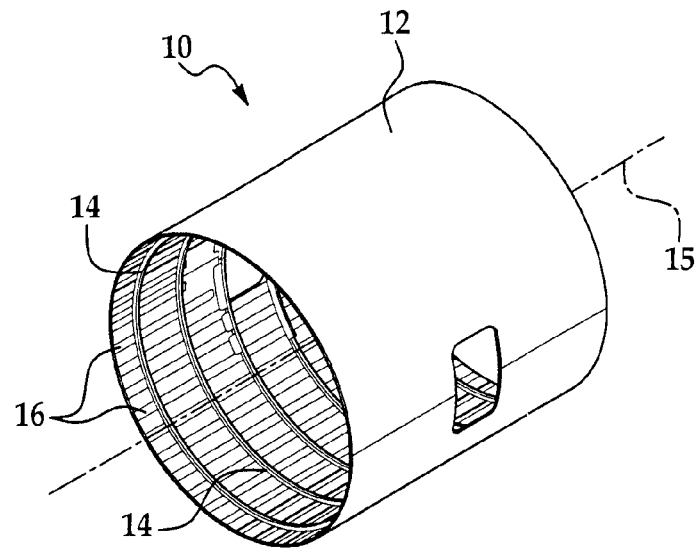
FIG. 1 is a perspective view of a section of bonded metal airplane fuselage according to the disclosed embodiments.

Referring first to FIGS. 1-5, a monocoque fuselage 10 for an aerospace vehicle such as an airplane, includes a longitudinal axis 15, and may possess any of various cross sectional shapes. In the illustrated embodiment, the fuselage 10 has a circular cross section, however other shapes are possible, including, without limitation, an oval or partial oval shape. The fuselage 10 broadly comprises an outer metal skin 12 formed of one or more sections, a plurality of barrel shaped, longitudinally spaced metal frames 14, and a plurality of circumferentially spaced, longitudinally extending stringers 16. The skin 12, frame 14 and stringers 16 may be formed from a suitable metal, such as, without limitation, aluminum or titanium.

Each of the frames 14 includes a single, inner flange 22 connected by a web 24 to an outer chord 23 defined by a pair of substantially coplanar outer flanges 26a, 26b which extend outwardly in opposite directions from the web 24. The web 24 may include a reinforcing land 28, and a plurality of circumferentially spaced, mouse hole-shaped openings 30 formed in the outer part of the web 24 and the double flanges 26a, 26b. In the illustrated embodiment, the frames 14 may be of one piece, unitary construction formed as by machining from a suitable metal such as, without limitation, aluminum, however, in other embodiments, the frames 14 may comprise multiple sections that are joined together using any of various means, such as, without limitation, splice plates (not shown).

Figure 3:
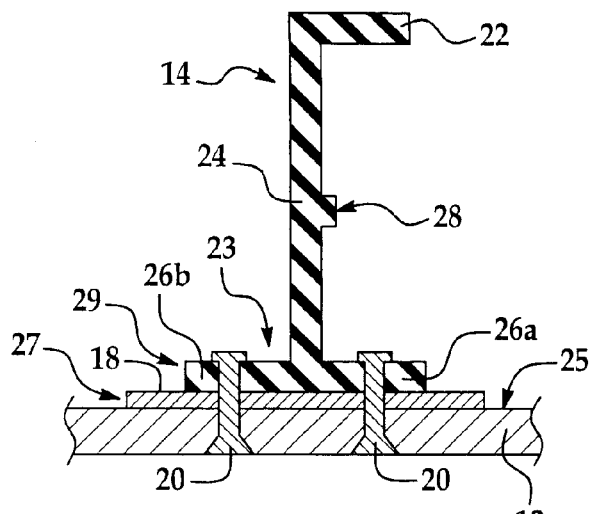
FIG. 3 is a cross sectional view taken along the line 3-3 in FIG. 2.
Figure 4:
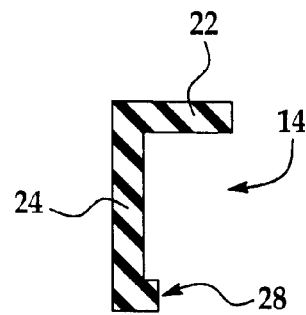
FIG. 4 is a sectional view taken along the line 4-4 in FIG. 2.

A circumferentially extending tear strap 18 formed from a suitable sheet of metal such as, without limitation, aluminum is sandwiched between the double flanges 26a, 26b and the inner surface 25 of the skin 12. The outer edges 27 of the tear strap 18 extend laterally beyond the outer edges 29 of the double flanges 26a, 26b, as best seen in FIG. 3. In one particular fuselage application by way of example and without limitation, the tear straps 18 may be formed of aluminum, measuring three inches wide and 0.040 inch thick.

Figure 2:
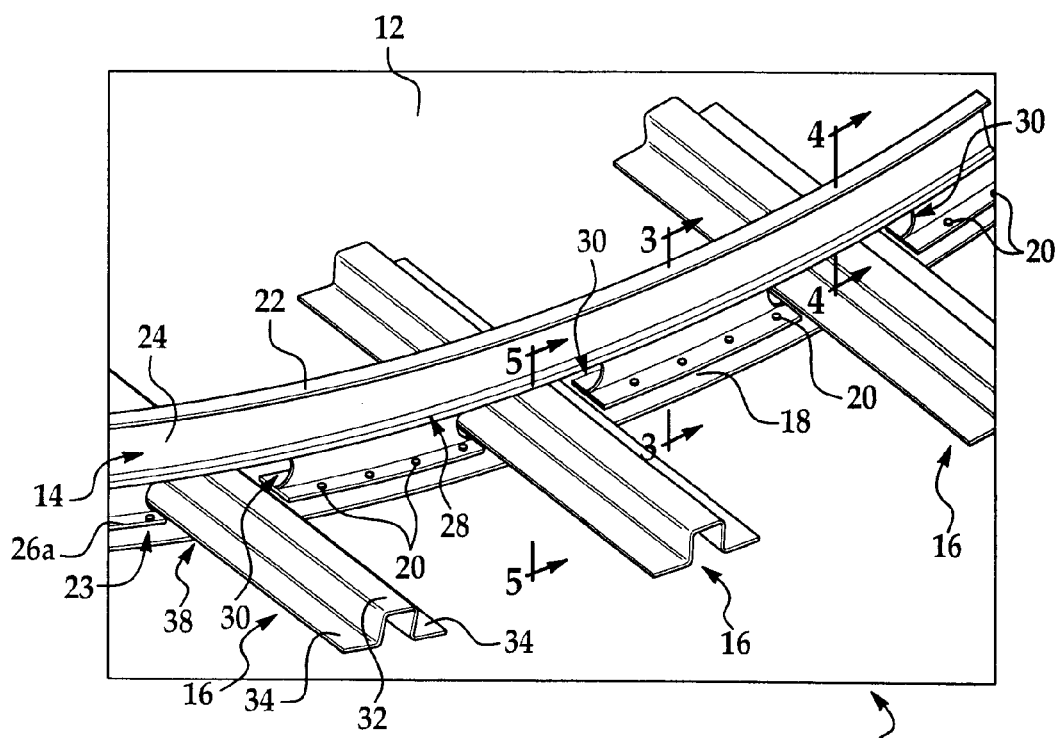
FIG. 2 is a perspective view of a portion of the interior of the fuselage shown in FIG. 1.
Figure 5:
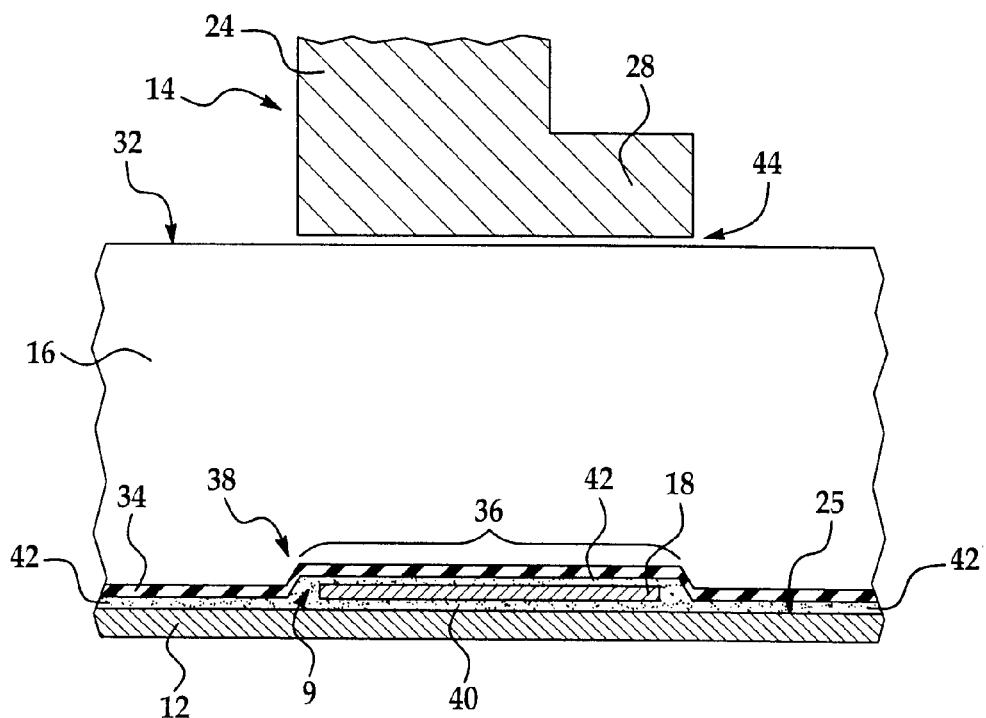
FIG. 5 is a sectional view taken along the line 5-5 in FIG. 2.

The stringers 16 are hat shaped in cross section as best seen in FIG. 2, and comprise a flat inner surface 32 and a pair of outer flanges 34 forming a "brim". The stringers 16 may comprise a suitable metal, such as, without limitation, aluminum or titanium and may be fabricated using common manufacturing techniques such as forming or extrusion. As best seen in FIG. 5, the inner surface 34 of each of the stringers 16 is slightly spaced from the frame 28. Each of the stringers 16 includes longitudinally spaced joggles 38 formed in the flanges 34 in the area 36 where the flanges 34 and tear strap 18 overlap each other. The joggles 38 form a clearance space within the stringers 16 for receiving the thickness of the tear straps 18.

As will be discussed below in more detail, the tear straps 18 pass through the joggles 38 formed in the stringer 16 and are bonded to both the stringer 16 and the inner surface 25 of the skin 12. The joggles 38 in the flanges 34 may be formed by any of various fabrication techniques, such as a forming process in which a set of tooling (not shown) crushes portions of the flanges 34. The tear straps 42 are bonded to the inner surface 25 of the skin 12 by a layer 40 of bonding adhesive suitable for bonding two metals such as aluminum. Similarly, another layer 42 of bonding adhesive is used to bond the stringers 16 to both the tear straps 42 and the inner surface 25 of the skin 12, on opposite sides of the tear straps 18.

Referring now particularly to FIGS. 2 and 3, the frames 14 may be fixed to the skin 12 by fasteners such as rivets 20 which pass through the skin 12, tear strap 18 and flanges 26a, 26b. Since the frames 14 are not directly connected to the stringers 16, loads on the skin 12 may be transferred directly through the tear straps 18 to the frames 14. Similarly, compressive and bending loads on the skin 12 may be transferred to the stringers 16 either directly, or indirectly to the stringers 16 through the tear straps 18.

From the forgoing, it can be appreciated that because the stringers 16 are fixed to the skin 12 and to the tear strap 18 by adhesive bonding, a large number of fasteners otherwise required to fix the stringers 16 to the skin 12 may be eliminated. Moreover, the enhanced stability and load carrying characteristics of the frames 14 and stringers 16 may allow the use of lighter gauge skins 12 and/or the elimination of skin gauge lands to accommodate fastener countersink depths. It should be noted here that although the illustrated bonded metal fuselage 10 has been shown with a uniform construction around its circumference, the construction techniques of the disclosed embodiments may be used in only a portion of the fuselage, such as only in an upper lobe of the fuselage 10. It should also be pointed out that the disclosed embodiments may be advantageously used in fuselage structures formed partly or completely from materials other than metal, such as composite materials. Thus for example, and without limitation, any or all of the stringers 16, tear straps 18 and skin 12 may comprise composite materials that may be bonded together using techniques and adhesives well known in the art of composite materials.

Figure 6:
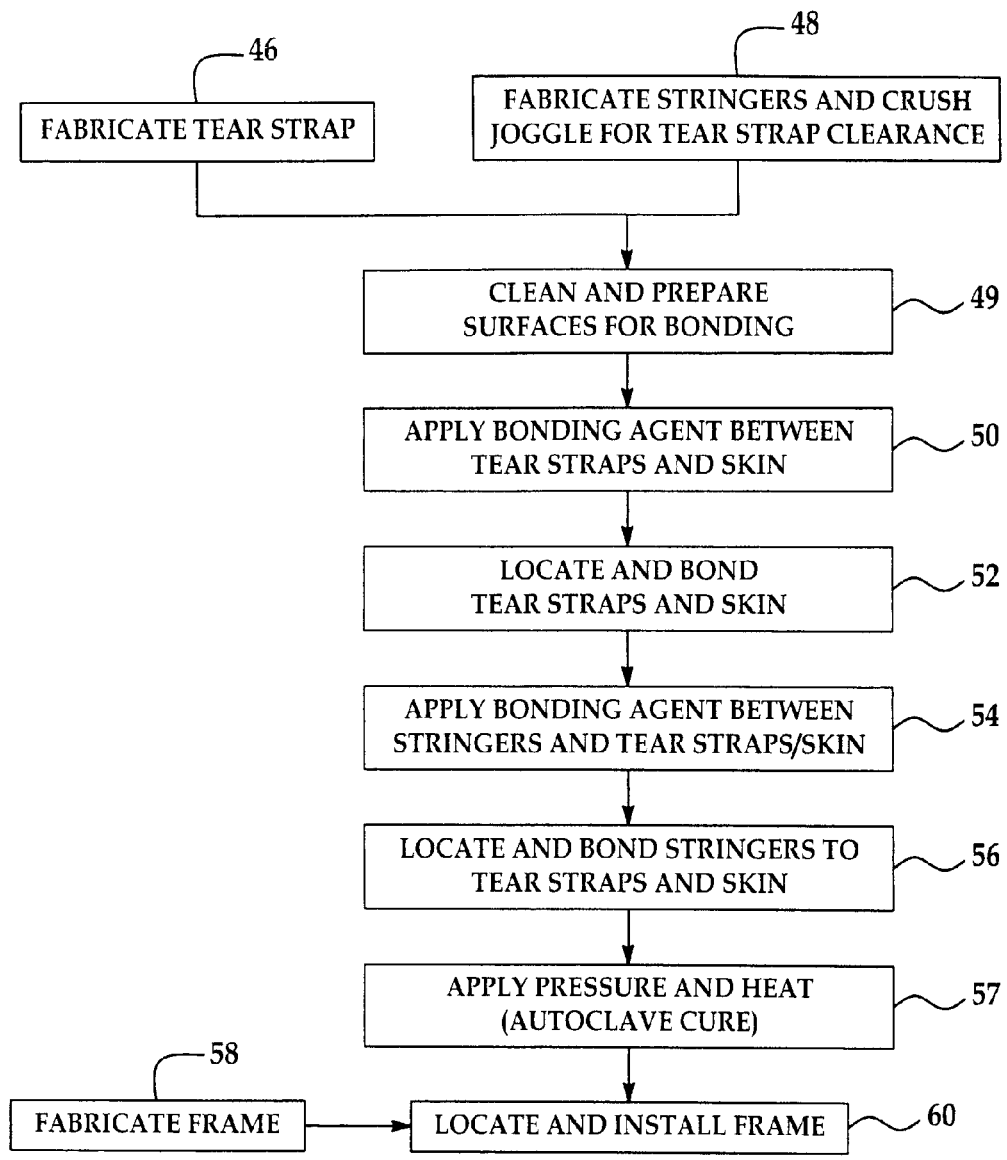
FIG. 6 is a flow diagram showing the steps of a method for fabricating a bonded metal fuselage.

As shown in FIG. 6, the process of making the bonded metal fuselage 10 begins with the fabrication of the tear straps 18 at step 46 and the fabrication of the stringers 16 at step 48. During fabrication of the stringers 16, the joggles 38 are created to provide clearances substantially matching the cross section geometry of the tear straps 18. The frames 14 are fabricated at step 58 using any of various fabrication techniques, depending upon the frame design and the application.

At step 49, the surfaces to be bonded are cleaned and prepared using commonly employed techniques. For example, the surfaces of the skin 12, stringers 16 and tear straps 18 may be cleaned using a suitable acid etch, following which these same surfaces may be anodized as by phosphoric acid anodizing in order to provide the bonded surfaces with corrosion protection. Additionally, depending upon the application, it may be desirable to apply a corrosion inhibiting primer to the bonded surfaces in order to increase the durability of the bonded joint. One primer suitable for use is BR-127 available from American Cyanamid. Primer thickness may be controlled to ensure design strength allowable and to maximize bond joint durability. Following the application of the primer, oven curing may be required.

Next, at step 50, a suitable bonding agent is applied to the skin 12 and the tear straps 18, following which, at step 52, the tear straps 18 are located and bonded to the skin 12. Any of various suitable bonding agents may be employed, depending upon the metals being bonded, and the application. For example, where the materials to be bonded are aluminum, one suitable bonding agent is AF 126 available from the Minnesota Mining and Manufacturing Company ("3M"). Other bonding agents are possible, however, such as FM-73 available from American Cyanamid.

At step 54, the bonding agent is applied to mating surfaces of the stringers 16, tear straps 18 and skin 12, following which at step 56 the stringers 16 are located and bonded to the tear straps 18 and to the skin 12. As part of the process of locating the stringer 16, the joggles 38 are aligned over the tear straps 18.

At step 57 the lay-up of the bonded parts may be placed in an autoclave (not shown) where pressure and heat are applied to the lay-up in order to cure the adhesive bonding agent. The autoclave processing times, temperatures and pressures will vary depending upon the application and the particular adhesive bonding agent that is employed.

After the autoclave processing is completed at step 57, the frames 22 are located and installed in the usual manner, which typically may involve drilling countersunk holes (not shown) through the skin 12, the tear straps 18 and the flanges 26a, 26b (see FIG. 2) following which fasteners such as rivets 20 are installed and upset.

Figure 7:
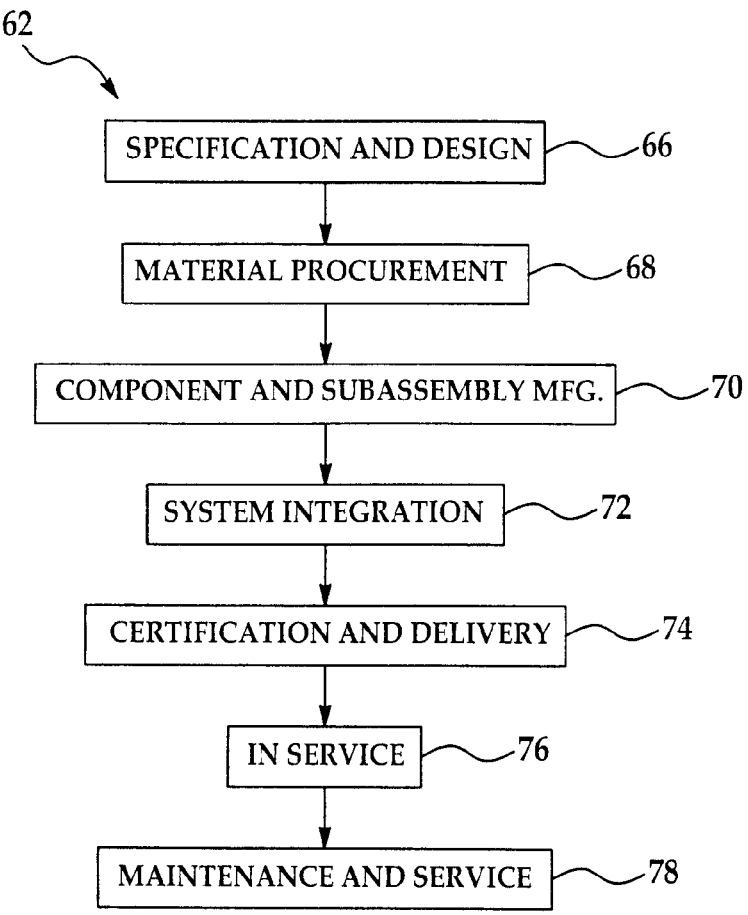
FIG. 7 is a flow diagram of aircraft production and service methodology.
Figure 8:
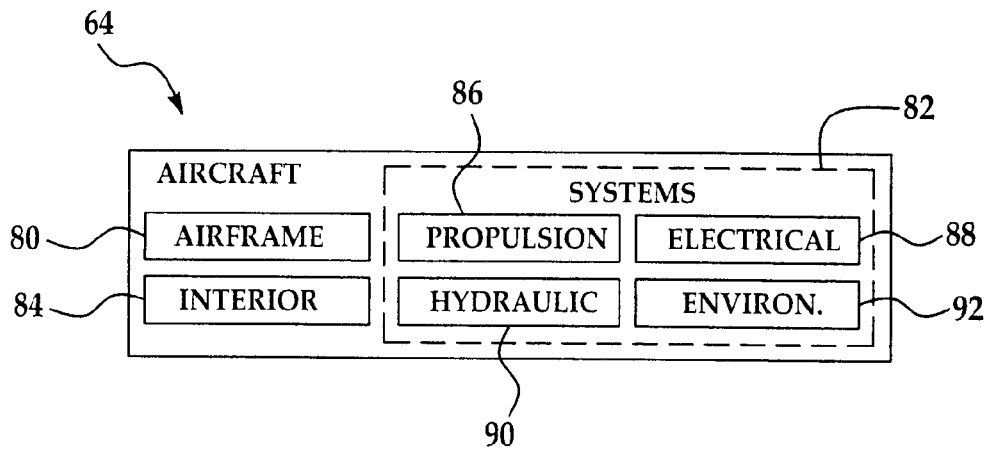
FIG. 8 is a block diagram of an aircraft.

Embodiments of the disclosure may find use in a variety of potential applications, particularly in the transportation industry, including for example, aerospace, marine and automotive applications. Thus, referring now to FIGS. 7 and 8, embodiments of the disclosure may be used in the context of an aircraft manufacturing and service method 62 as shown in FIG. 7 and an aircraft 64 as shown in FIG. 8. During pre-production, exemplary method 62 may include specification and design 66 of the aircraft 64 and material procurement 68. During production, component and subassembly manufacturing 70 and system integration 72 of the aircraft 64 takes place. Thereafter, the aircraft 64 may go through certification and delivery 74 in order to be placed in service 76. While in service by a customer, the aircraft 64 is scheduled for routine maintenance and service 78 (which may also include modification, reconfiguration, refurbishment, and so on).

Each of the processes of method 62 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 92 produced by exemplary method 62 may include an airframe 80 with a plurality of systems 82 and an interior 84. Examples of high-level systems 82 include one or more of a propulsion system 86, an electrical system 88, a hydraulic system 90, and an environmental system 92. Any number of other systems may be included. Although an aerospace example is shown, the principles of the disclosure may be applied to other industries, such as the marine and automotive industries.

Systems and methods embodied herein may be employed during any one or more of the stages of the production and service method 62. For example, components or subassemblies corresponding to production process 90 may be fabricated or manufactured in a manner similar to components or subassemblies produced while the aircraft 92 is in service. Also, one or more apparatus embodiments, method embodiments, or a combination thereof may be utilized during the production stages 70 and 72, for example, by substantially expediting assembly of or reducing the cost of an aircraft 64. Similarly, one or more of apparatus embodiments, method embodiments, or a combination thereof may be utilized while the aircraft 64 is in service, for example and without limitation, to maintenance and service 62.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An aerospace vehicle fuselage, comprising:
a monocoque structure having an outer skin, tear straps bonded to the outer skin and stringers bonded to the outer skin and to the tear straps;
frames; and,
fasteners for fastening the frames to the tear straps and to the skin.

2. The aerospace vehicle fuselage of claim 1, wherein the frames include openings therein and the stringers extend through the openings transverse to the frames.

3. The aerospace vehicle fuselage of claim 1, wherein: stringers extend traverse to tear straps, and
the tear straps are sandwiched between the stringers and the skin.

4. The aerospace vehicle fuselage of claim 1, wherein: each of the stringers includes at least one flange facing the skin, and
the at least one stringer flange includes a joggle through which one of the tear strap extends.

5. The aerospace vehicle fuselage of claim 4, wherein the tear straps are bonded to the stringers in the area of the joggle.

6. The aerospace vehicle fuselage of claim 1, wherein the skin, the tear straps and the stringers are aluminum.

7. The aerospace vehicle fuselage of claim 1, wherein:
each of the frames includes a web and a pair of oppositely extending flanges on one end of the web, each of the flanges engaging one of the tear straps, and
wherein the fasteners pass through the flanges, the tear straps and the skin.

8. A fuselage for a vehicle having a longitudinal axis, comprising:
a skin having an inner surface and an outer surface;
a plurality of longitudinally extending, circumferentially spaced stringers bonded to the inner surface of the skin;
a plurality of longitudinally spaced, circumferentially extending frames fastened to the skin; and
a plurality of tear straps respectively substantially sandwiched between the frames and the inner surface of the skin, each of the tear straps being bonded to the inner surface of the skin.

9. The fuselage of claim 8, further comprising:
a plurality of fasteners passing through the skin for fastening the frames to the skin, and
wherein the stringers extend transverse to and pass through the frames.

10. The fuselage of claim 8, wherein portions of the stringers are bonded to the tear straps.

11. The fuselage of claim 8, wherein:
each of the stringers includes a joggle along one side thereof defining a clearance between the stringer and the skin, and
the tear strap passes through the clearance.

12. The fuselage of claim 8, wherein the frames, the stringers, the tear straps and the skin are aluminum.

13. The fuselage of claim 8, wherein:
each of the frames includes first and second oppositely facing flanges lying substantially in the same plane, and
the fasteners pass through the first and second flanges.

14. A method of fabricating a fuselage for an aerospace vehicle, comprising:
fixing frames to a skin of the fuselage;
placing tear straps between each of the frames and the skin;
bonding the tear straps to an inner surface of the skin;
fixing stringers to the skin; and
bonding portions of the stringers to the tear straps.

15. The method of claim 14, wherein fixing the frames to the skin is performed by installing fasteners between each of two flanges on each frame and the skin.

16. The method of claim 14, further comprising:
forming joggles in portions of the stringers to receive the tear straps.

17. The method of claim 14, wherein the frames are fixed to the skin after the tear straps have been bonded to the skin and the stringers have been bonded to portions of the straps.

18. A fuselage fabricated by the method of claim 14.

19. A method of fabricating a fuselage for an airplane, comprising:
bonding metal tear straps to an inner surface of a metal fuselage skin;
bonding metal stringers to the inner surface of the skin and to the tear straps;
placing frames over the tear straps; and,
fastening the frames to the tear straps and to the skin using fasteners.

20. The method of claim 19, further comprising:
forming an joggle in one side of each of the stringers for receiving a tear strap.

21. The method of claim 19, further comprising forming a pair of flanges on the frame, and wherein:
placing the frame on the tear strap includes placing the flanges in face-to-face contact with the tear strap, and
fastening the frames includes placing fasteners through the flanges, the tear straps and the skin.

22. The method of claim 19, further comprising:
subjecting a bonded lay-up of the skin, the frames, the stringers and the tear straps to heat and pressure for preselected period of time in an autoclave.

23. A fuselage fabricated by the method of claim 19.

24. An elongate monocoque fuselage for an airplane, comprising:
an outer aluminum skin having an inner surface and an outer surface;
a plurality of longitudinally spaced, circumferentially extending aluminum frames;
a plurality of circumferentially extending, longitudinally spaced aluminum tear straps respectively sandwiched between the frames and the inner surface of the skin, each of the tear straps being bonded to the inner surface of the skin;
a plurality of longitudinally extending, circumferentially spaced aluminum stringers each having a hat-shaped cross section and a pair of flanges bonded to the inner surface of the skin, each of the flanges including a joggle defining a clearance space receiving one of the tear straps, the stringers being bonded to the tear straps in the area of the joggles; and,
fasteners passing through the skin and the tear straps for fastening the frames to the tear straps and the skin.

25. A method of fabricating a monocoque fuselage for an airplane, comprising:
fabricating an aluminum skin, aluminum frames and aluminum tear straps;
fabricating aluminum stringers, including forming spaced apart joggles in each of the stringers;
forming a lay-up by—
applying a bonding adhesive between the tear straps and the skin,
locating the stringers on the skin including aligning the joggles over the tear straps, and
applying an adhesive between the stringers and the tear straps, and between the stringers and the skin;
curing the bonding adhesive by subjecting the lay-up to heat and pressure;
locating the frames over the tear straps; and,
fixing the frames to the tear straps and to the skin by installing fasteners between the frames, the tear straps and the skin.

* * * * *